US011277596B2

(12) United States Patent
Adachi

(10) Patent No.: US 11,277,596 B2
(45) Date of Patent: Mar. 15, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Daichi Adachi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 16/660,338

(22) Filed: Oct. 22, 2019

(65) Prior Publication Data

US 2020/0137371 A1    Apr. 30, 2020

(30) Foreign Application Priority Data

Oct. 26, 2018  (JP) .............................. JP2018-202034

(51) Int. Cl.
*H04N 13/111*  (2018.01)
*H04N 13/282*  (2018.01)
*H04N 13/243*  (2018.01)

(52) U.S. Cl.
CPC ......... *H04N 13/111* (2018.05); *H04N 13/243* (2018.05); *H04N 13/282* (2018.05)

(58) Field of Classification Search
CPC ... H04N 13/282; H04N 13/243; G06T 15/205
See application file for complete search history.

(56) References Cited

U.S. PATENT DOCUMENTS

| 6,741,250 | B1 * | 5/2004 | Furlan ................... G06T 19/003 345/427 |
| 7,106,361 | B2 * | 9/2006 | Kanade ............. H04N 5/23299 348/159 |
| 7,123,746 | B2 * | 10/2006 | Meniere ................... G01V 8/10 382/103 |
| 7,583,196 | B2 * | 9/2009 | Cohignac ............. G08B 21/082 134/1.3 |
| 9,147,283 | B1 * | 9/2015 | McVey ................... G06T 17/05 |
| 9,412,183 | B2 * | 8/2016 | Johnson ................ G06T 11/001 |
| 10,181,249 | B2 * | 1/2019 | Snyder ............... G08B 13/1961 |
| 10,225,481 | B2 * | 3/2019 | Tamegai ................ H04N 9/735 |

(Continued)

FOREIGN PATENT DOCUMENTS

JP       2017-212592 A    11/2017

*Primary Examiner* — Boubacar Abdou Tchoussou
(74) *Attorney, Agent, or Firm* — Canon U.S.A., Inc. IP Division

(57) ABSTRACT

An image processing apparatus for generating a virtual viewpoint image based on a plurality of images obtained by capturing an object in an image-capturing region from a plurality of directions by using a plurality of image capturing apparatuses includes a viewpoint acquisition unit configured to acquire viewpoint information indicating a position of a virtual viewpoint, and a generation unit configured to generate the virtual viewpoint image corresponding to the position of the virtual viewpoint indicated by the acquired viewpoint information, the virtual viewpoint image including at least one of an image depending on a positional relationship between a boundary and the virtual viewpoint and/or an image representing the boundary, the boundary being between an inside and an outside of a predetermined region included in the image-capturing region.

17 Claims, 12 Drawing Sheets

(56) References Cited

U.S. PATENT DOCUMENTS

| | | | | |
|---|---|---|---|---|
| 10,785,384 B2* | 9/2020 | Hung | .................... | H04M 1/18 |
| 2002/0145660 A1* | 10/2002 | Kanade | ................ | H04N 5/232 |
| | | | | 348/36 |
| 2002/0191815 A1* | 12/2002 | Meniere | ................ | G01V 8/10 |
| | | | | 382/103 |
| 2004/0201587 A1* | 10/2004 | Mizusawa | ............ | G06T 15/205 |
| | | | | 345/427 |
| 2007/0052697 A1* | 3/2007 | Cohignac | ............ | G08B 21/082 |
| | | | | 345/418 |
| 2010/0329358 A1* | 12/2010 | Zhang | ................ | H04N 19/187 |
| | | | | 375/240.26 |
| 2014/0071264 A1* | 3/2014 | Seo | ..................... | H04N 9/735 |
| | | | | 348/81 |
| 2015/0110396 A1* | 4/2015 | Johnson | .............. | H04N 1/6077 |
| | | | | 382/167 |
| 2015/0341621 A1* | 11/2015 | Aagaard | ............. | H04N 17/002 |
| | | | | 348/47 |
| 2017/0214836 A1* | 7/2017 | Tamegai | ........... | H04N 5/23238 |
| 2017/0280133 A1* | 9/2017 | Niemela | ............ | H04N 13/257 |
| 2018/0089980 A1* | 3/2018 | Snyder | ............. | G06K 9/00771 |
| 2019/0098179 A1* | 3/2019 | Hung | .................... | H04N 9/735 |

\* cited by examiner

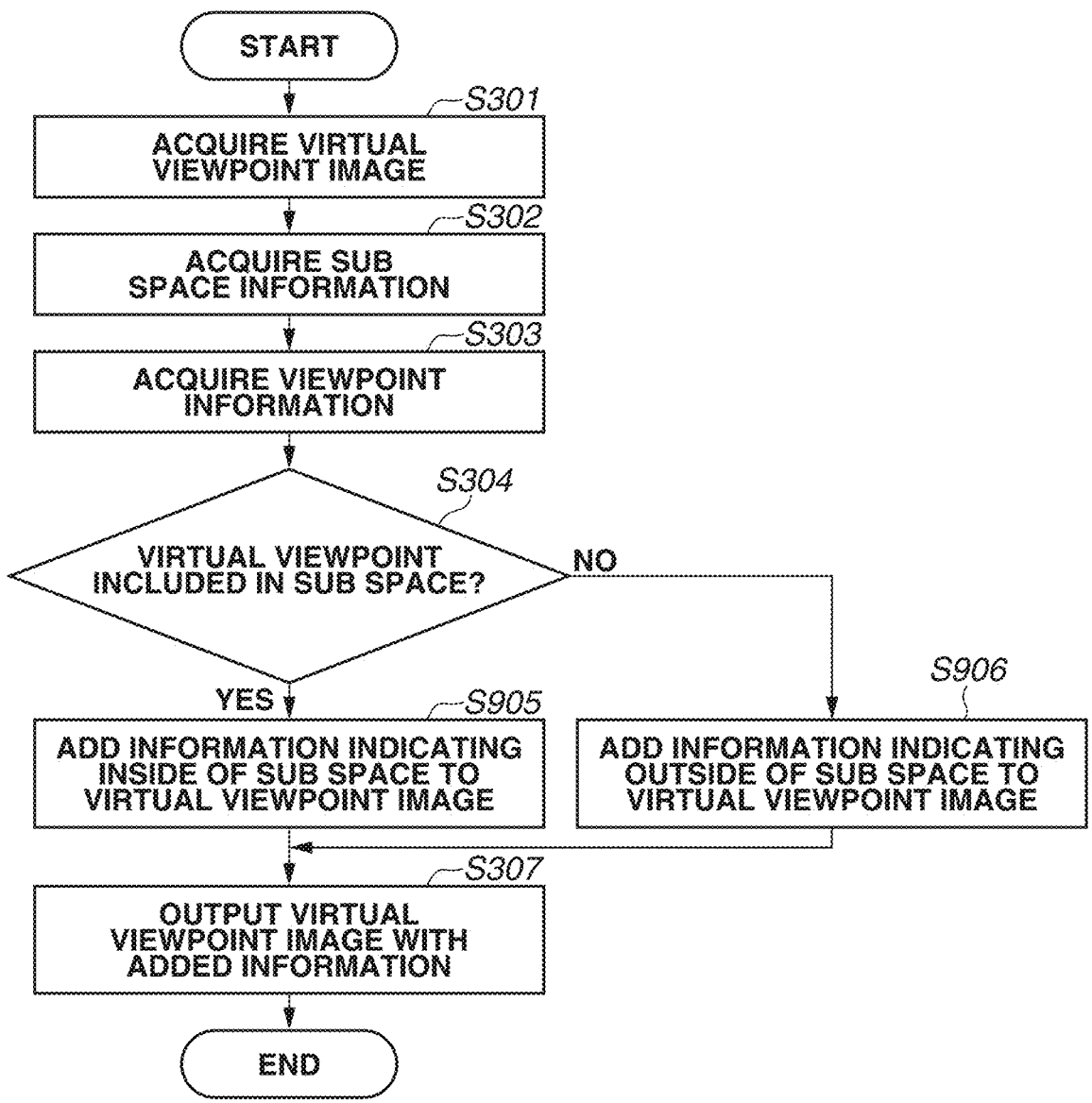

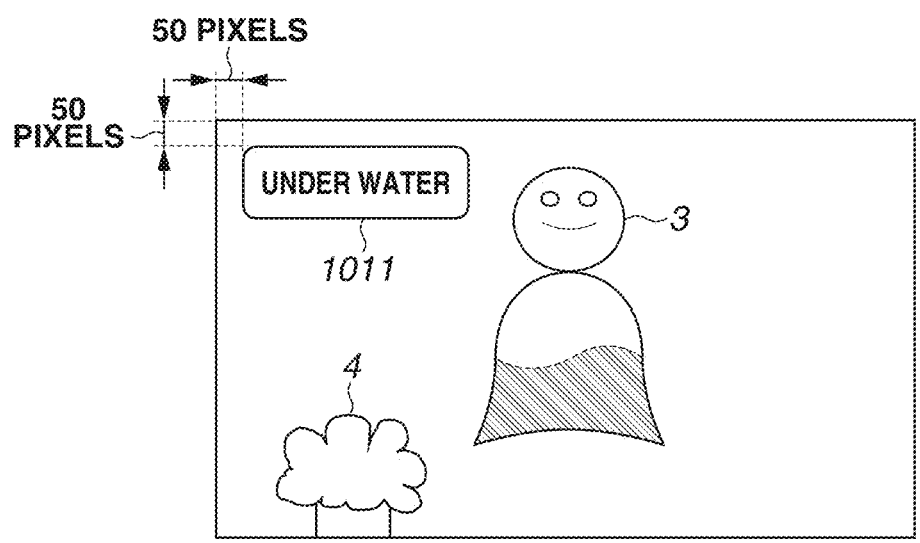
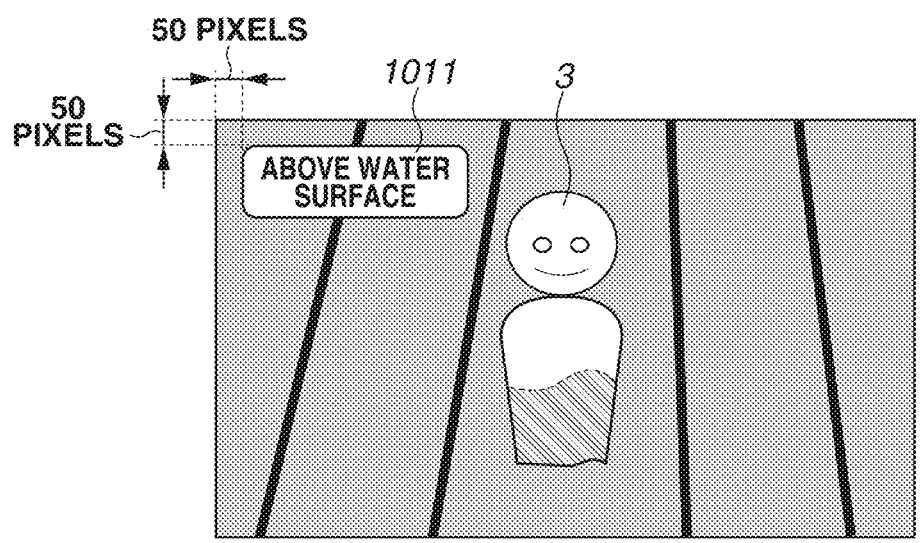

IMAGE PROCESSING APPARATUS, IMAGE PROCESSING METHOD, AND STORAGE MEDIUM

BACKGROUND

Field of the Disclosure

The present disclosure generally relates to a virtual viewpoint image generated based on a plurality of images captured by a plurality of image capturing apparatuses.

Description of the Related Art

There is a technique for generating a virtual viewpoint image having a viewpoint that is changeable. Such a viewpoint image is generated based on a plurality of images acquired in synchronous image capturing from multiple viewpoints by using a plurality of image capturing apparatuses (cameras) installed at different positions. For example, in sporting events such as soccer and basketball, a virtual viewpoint image is generated based on a plurality of captured images using a viewpoint set by a user, so that the user can observe the game from various angles. Displaying such virtual viewpoint images can bring the realism of a game to users as compared with a case where a normally captured image is displayed.

Japanese Patent Application Laid-Open No. 2017-212592 discusses a technique for extracting an object region from captured images by using background subtraction information. Japanese Patent Application Laid-Open No. 2017-212592 also discusses a technique for generating a virtual viewpoint content by generating a three-dimensional model of an object by using a result of extraction from a plurality of images captured by a plurality of cameras and rendering the generated model according to a virtual viewpoint.

However, it is sometimes difficult for a user viewing a virtual viewpoint image generated by a conventional technique to recognize what virtual viewpoint position corresponds to the virtual viewpoint image. If a virtual viewpoint image is generated based on the background subtraction information by using the conventional method in a case of generating a virtual viewpoint image for underwater sports, such as artistic swimming, for example, an image of water in a pool is processed as a background to generate three-dimensional models of swimmers. Accordingly, a three-dimensional model of water in a pool is not generated from captured images. Although three-dimensional models of poolside and spectators' seats in the background can be pre-generated by three-dimensional measurement using laser or the like, a three-dimensional model of water in a pool is not generated by a similar method because water does not sufficiently reflect light such as laser light. When a virtual viewpoint image is generated, in which water in a pool is not reproduced since a three-dimensional model of water is not generated, it is difficult for users to recognize whether the thus generated virtual point image is an image viewed from a virtual viewpoint under the water or an image viewed from a virtual viewpoint above the water surface.

SUMMARY

According to an aspect of the present disclosure, an image processing apparatus for generating a virtual viewpoint image based on a plurality of images obtained by capturing an object in an image-capturing region from a plurality of directions by using a plurality of image capturing apparatuses includes a viewpoint acquisition unit configured to acquire viewpoint information indicating a position of a virtual viewpoint, and a generation unit configured to generate the virtual viewpoint image corresponding to the position of the virtual viewpoint indicated by the acquired viewpoint information, the virtual viewpoint image including at least one of an image depending on a positional relationship between a boundary and the virtual viewpoint and an image representing the boundary, the boundary being between an inside and an outside of a predetermined region included in the image-capturing region, wherein the object can be present across the inside and the outside of the predetermined region, and the virtual viewpoint is movable between the inside and the outside of the predetermined region.

Further features of the present disclosure will become apparent from the following description of exemplary embodiments with reference to the attached drawings.

BRIEF DESCRIPTION OF THE DRAWINGS

FIG. 6 is a diagram illustrating an example of sub space information.

FIG. 9 is a flowchart illustrating an example of an operation of the image processing apparatus.

FIGS. 10A and 10B are diagrams illustrating examples of virtual viewpoint images output by the image processing apparatus.

DESCRIPTION OF THE EMBODIMENTS

[Configuration of Information Processing System]

Figure 1:
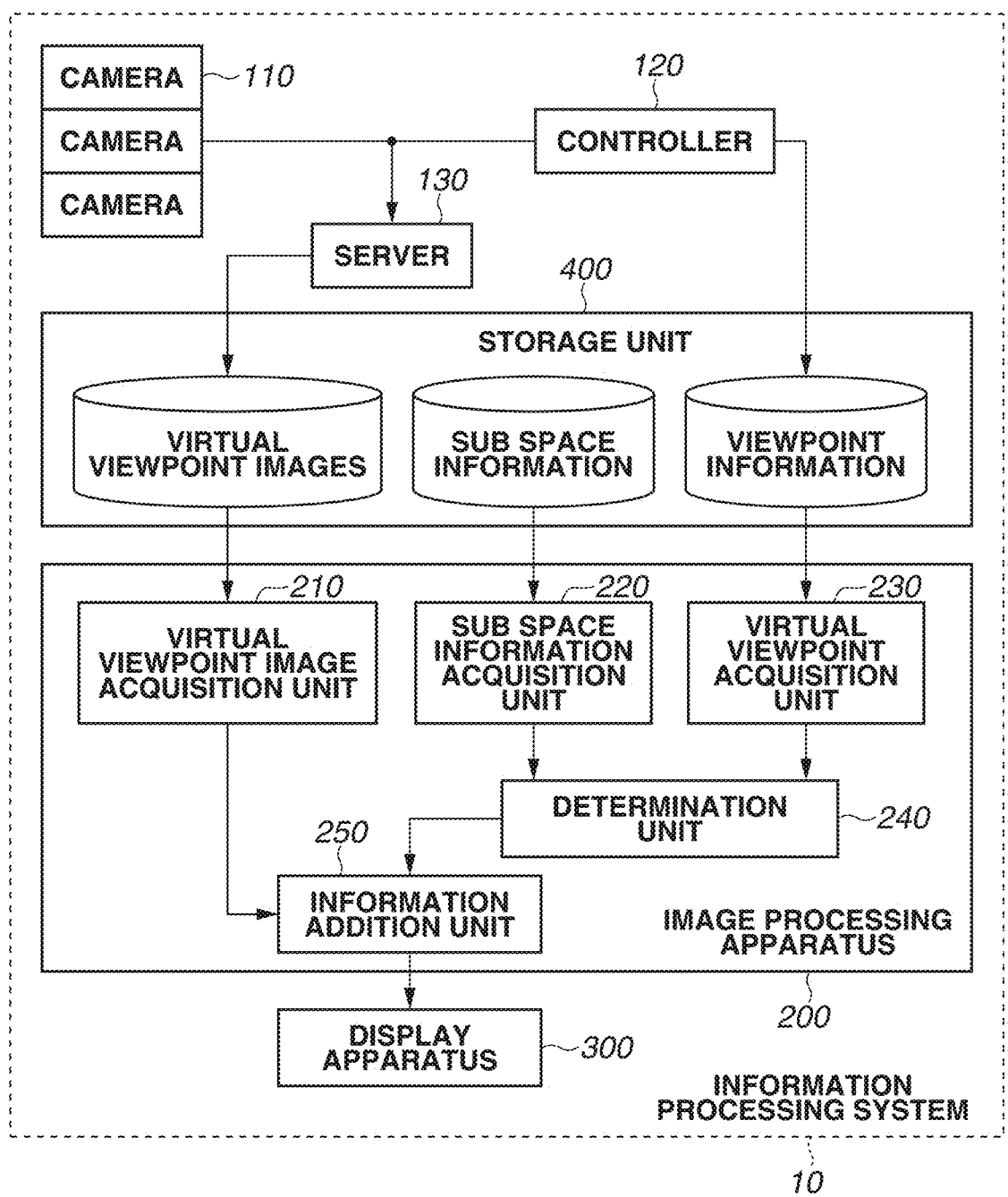
FIG. 1 is a diagram illustrating an example of a configuration of an information processing system.

FIG. 1 is a diagram illustrating an example of a configuration of an information processing system 10. The information processing system 10 generates a virtual viewpoint image representing an appearance from a specified virtual viewpoint based on a plurality of images captured by a plurality of cameras and a specified virtual viewpoint. A virtual viewpoint image according to the present exemplary embodiment is also referred to as a free viewpoint image. However, the virtual viewpoint image is not limited to an image corresponding to a viewpoint freely (arbitrarily) specified by a user. For example, an image corresponding to a viewpoint selected from a plurality of candidates by the user is also included in virtual viewpoint images. Although the present exemplary embodiment will be described below centering on a case where a virtual viewpoint is specified through a user operation, a virtual viewpoint may be automatically specified by the information processing system 10 based on a result of image analysis. Although the present exemplary embodiment will also be described below centering on a case where a virtual viewpoint image is a moving image, a virtual viewpoint image to be processed by the information processing system 10 may be a still image.

The information processing system 10 includes a camera group 110, a controller 120, a server 130, an image processing apparatus 200, a display apparatus 300, and a storage unit 400. The camera group 110 includes a plurality of cameras for capturing images of an image-capturing region from a plurality of directions. More specifically, the image-capturing region is a space to be captured by at least any one of the plurality of cameras included in the camera group 110. Although the image-capturing region is, for example, a stadium where swimming sports are held, the image-capturing region is not limited thereto and may be a stadium where other sporting events are held or a stage where a concert or theater is performed. The plurality of cameras included in the camera group 110 is installed at respectively different positions surrounding such an image-capturing region, and captures images of the image-capturing region in a synchronous way. Although the camera group 110 includes three cameras as illustrated in FIG. 1, the number of cameras included in the camera group 110 is not limited thereto.

The present exemplary embodiment will be described below using a case in which the image-capturing region is a swimming stadium and that the cameras are installed outside the pool and under the water of the pool. For example, 30 cameras are installed outside the pool, and 30 cameras are installed in the water, being oriented toward the center of a 50-m pool. Although cameras may be installed either outside or inside the pool, using cameras installed both inside and outside the pool allows generating a high-definition virtual viewpoint image since an underwater camera can capture a higher definition underwater image. Alternatively, the camera group 110 are installed not all around the image-capturing region, and may be installed only in certain directions of the image-capturing region depending on limitations on an installation location. In addition, the camera group 110 may include cameras having different functions, such as telephotographic cameras and wide-angle cameras.

The controller 120 includes a joy stick, buttons, a touch panel, and other operation portions, and receives an operation for specifying a virtual viewpoint from the user. Then, the controller 120 outputs viewpoint information indicating a virtual viewpoint specified by a user operation to the server 130 and the storage unit 400. Although the viewpoint information includes the position and orientation of a virtual camera corresponding to a virtual viewpoint, the present disclosure is not limited thereto. The viewpoint information may include such information as the field angle, focal length, and focal position of the virtual camera. The server 130 generates a virtual viewpoint image corresponding to a virtual viewpoint indicated by the viewpoint information, based on the plurality of captured images acquired from the camera group 110 and the viewpoint information acquired from the controller 120. Then, the server 130 outputs the generated virtual viewpoint image to the storage unit 400.

An example of a method for generating a virtual viewpoint image will be described below. The server 130 pre-acquires a background model representing the three-dimensional shape of the background (for example, the pool and spectators' seats) in the image-capturing region. The server 130 also generates a foreground model representing the three-dimensional shape of an object (for example, a swimmer) as the foreground in the image-capturing region by using the background subtraction information based on the plurality of captured images acquired from the camera group 110. Then, the server 130 generates a virtual viewpoint image by mapping the captured images corresponding to the viewpoint information acquired from the controller 120 to the generated foreground model and the acquired background model and then performing rendering. The method for generating a virtual viewpoint image is not limited thereto. Applicable methods include a method for generating a virtual viewpoint image by performing projection conversion on captured images without using a three-dimensional model.

The storage unit 400 stores the virtual viewpoint image output from the server 130, the viewpoint information output from the controller 120, and sub space information in a recording medium, such as a hard disk drive, an SSD, and an SD card. The sub space information is region information including coordinate data representing a sub space as a predetermined region in the three-dimensional space, for example, a region in the pool filled with water. Although the sub space information is input to the storage unit 400 based on, for example, a result of pre-measurement of the image-capturing region, the present disclosure is not limited thereto. The sub space information may be input based on a user operation via the controller 120 or may be input through other methods.

The image processing apparatus 200 includes a virtual viewpoint image acquisition unit 210 (hereinafter referred to as an image acquisition unit 210), a sub space information acquisition unit 220 (hereinafter referred to as an information acquisition unit 220), a virtual viewpoint acquisition unit 230 (hereinafter referred to as a viewpoint acquisition unit 230), a determination unit 240, and an information addition unit 250. The image acquisition unit 210, the information acquisition unit 220, and the viewpoint acquisition unit 230 acquire a virtual viewpoint image, sub space information, and viewpoint information, respectively, from the storage unit 400 connected with the image processing apparatus 200 via a network. The image processing apparatus 200 may be connected with the storage unit 400 without using a network. The determination unit 240 determines whether the position of a specified virtual viewpoint is included in the sub space based on the acquired sub space information and viewpoint information, and outputs the determination result to the information addition unit 250. The information addition unit 250 adds information to the virtual viewpoint image acquired from the storage unit 400 based on the determination result by the determination unit 240 and outputs the virtual viewpoint image to the display apparatus 300. Like an image output from the server 130, an image output from the image processing apparatus 200 is also a virtual viewpoint image based on a plurality of images obtained by capturing the image-capturing region from a plurality of directions by using the camera group 110. Information to be added by the information addition unit 250 will be described in detail below.

The display apparatus 300 displays the virtual viewpoint image output from the image processing apparatus 200 to the user. Although, in the example illustrated in FIG. 1, the display apparatus 300 is connected with the image processing apparatus 200, a plurality of display apparatuses 300 may be connected to the image processing apparatus 200. The output destination of data from the image processing apparatus 200 is not limited to the display apparatus 300 and may be a storage device for storing data.

The configuration of the information processing system 10 is not limited to the configuration illustrated in FIG. 1. In the example illustrated in FIG. 1, the storage unit 400 is configured as an apparatus separate from the server 130 and the image processing apparatus 200. However, the present disclosure is not limited thereto. The storage unit 400 may be included in the server 130 or in the image processing apparatus 200. Virtual viewpoint images, the viewpoint information, and the sub space information may be separately stored in a plurality of apparatuses. The server 130 and the image processing apparatus 200 may be integrally configured.

[Configuration of Image Processing Apparatus]

Figure 2:
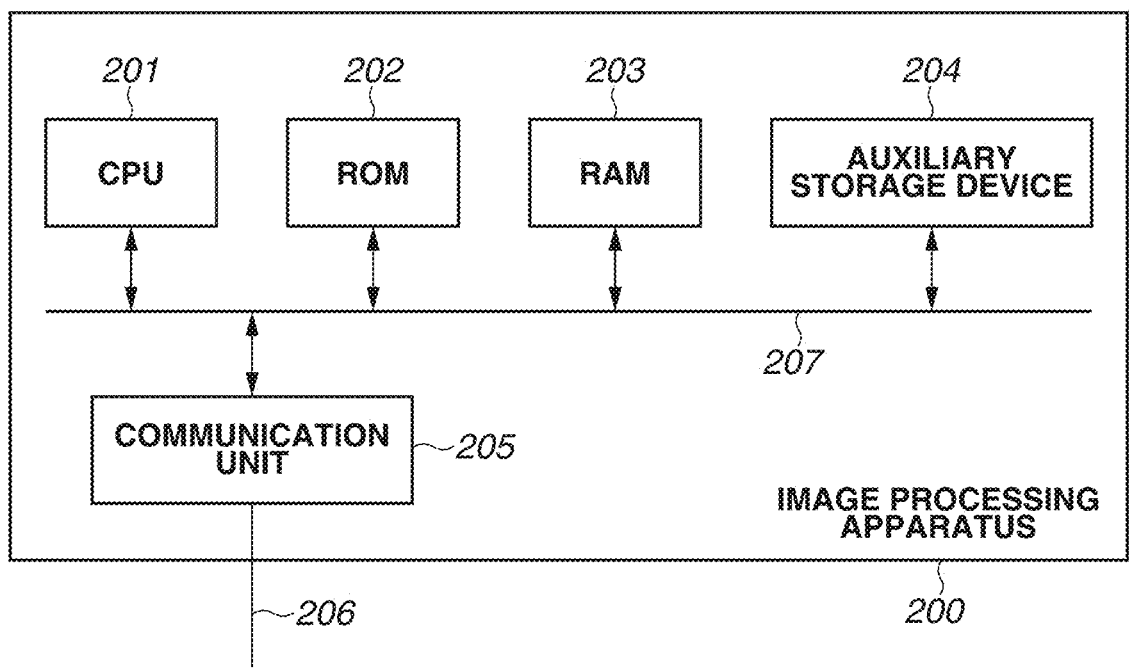
FIG. 2 is a diagram illustrating an example of a hardware configuration of an image processing apparatus.

The hardware configuration of the image processing apparatus 200 will be described below with reference to FIG. 2. The image processing apparatus 200 includes a central processing unit (CPU) 201, a read only memory (ROM) 202, a random access memory (RAM) 203, an auxiliary storage device 204, and a communication unit 205. The CPU 201 is a central processing unit for controlling the entire image processing apparatus 200. When the CPU 201 totally controls the processing sequence of the image processing apparatus 200, each function unit of the image processing apparatus 200 illustrated in FIG. 1 is implemented. The image processing apparatus 200 may have one or a plurality of dedicated hardware components different from the CPU 201, and at least part of processing by the CPU 201 may be executed by the dedicated hardware components. Examples of dedicated hardware components include an Application Specific Integrated Circuit (ASIC), a Field Programmable Gate Array (FPGA), and a Digital Signal Processor (DSP).

The ROM 202 and the auxiliary storage device 204 store programs and data for implementing processing illustrated in flowcharts (described below). The RAM 203 is used to temporarily store data and load a program. The communication unit 205 transmits and receives data to/from an external apparatus, such as the storage unit 400 and the display apparatus 300, via a network 206. Components of the image processing apparatus 200 are mutually connected with each other via a bus 207.

[Processing Flow of Image Processing Apparatus]

Figure 3:
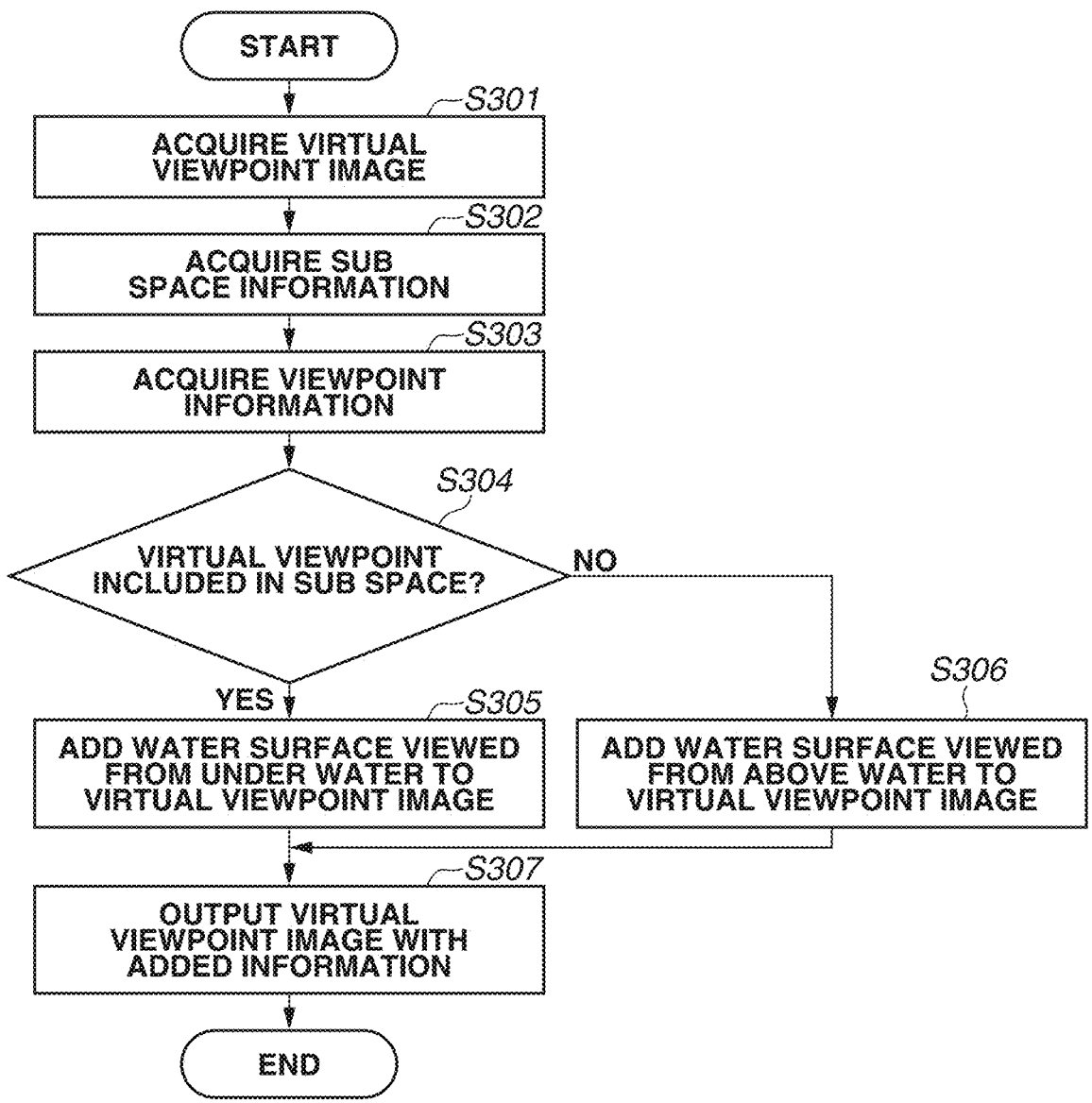
FIG. 3 is a flowchart illustrating an example of an operation of the image processing apparatus.

A flow of processing of the image processing apparatus 200 will be described below with reference to the flowchart illustrated in FIG. 3. A series of processing illustrated in FIG. 3 is implemented when the CPU 201 of the image processing apparatus 200 loads a control program stored in the ROM 202 or the auxiliary storage device 204 into the RAM 203 and then executes the program. The processing illustrated in FIG. 3 may be partly or entirely implemented by one or a plurality of dedicated hardware components different from the CPU 201. This also applies to processing in flowcharts illustrated in FIGS. 9 and 11 (described below). The processing illustrated in FIG. 3 is started, for example, at the timing when an instruction for generating a virtual viewpoint image with information added by the information addition unit 250 is input to the image processing apparatus 200. However, the timing of starting the processing illustrated in FIG. 3 is not limited thereto.

Figure 4:
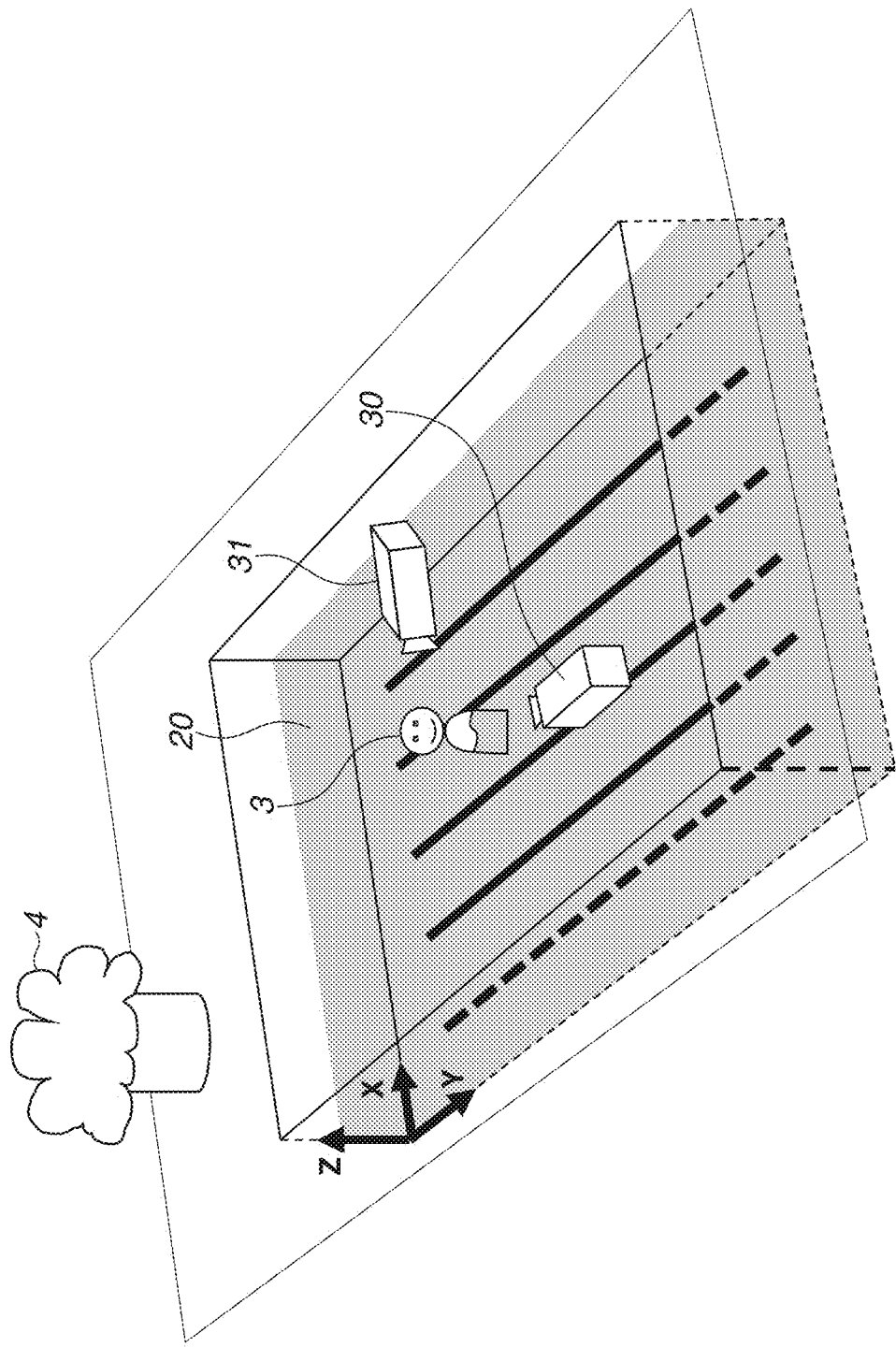
FIG. 4 is a diagram illustrating an example of a position of a virtual viewpoint in a three-dimensional space.
Figure 5A:
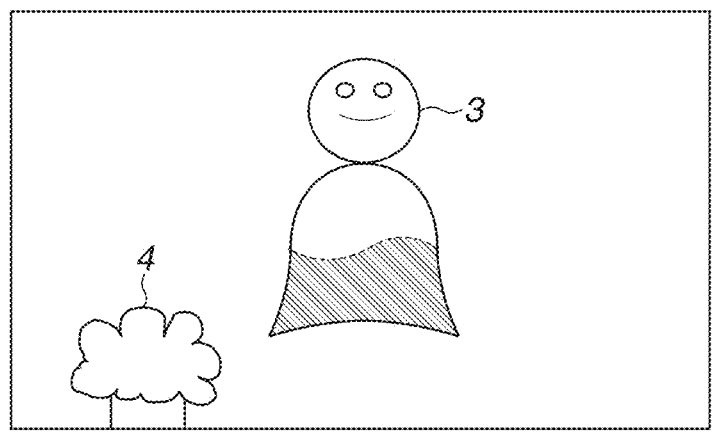
FIGS. 5A and 5B are diagrams illustrating examples of virtual viewpoint images generated by a server.
Figure 5B:
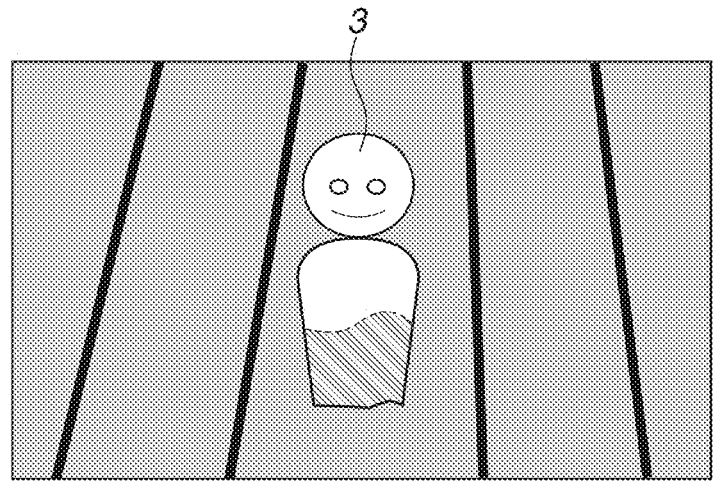

In step S301, the image acquisition unit 210 acquires a virtual viewpoint image from the storage unit 400. A virtual viewpoint image is an image in the 24-bit Portable Network Graphics (PNG) format. However, the format of a virtual viewpoint image is not limited thereto. FIGS. 5A and 5B are diagrams illustrating examples of virtual viewpoint images acquired by the image acquisition unit 210. FIG. 4 is a diagram illustrating an image-capturing region and a virtual viewpoint situation corresponding to the virtual viewpoint images illustrated in FIGS. 5A and 5B. Referring to the situation illustrated in FIG. 4, a sub space 20 as an underwater region, a foreground object 3, a background object 4, and virtual viewpoints 30 and 31 exist in the three-dimensional space corresponding to the swimming stadium as an image-capturing region. The foreground object 3 is located across the boundary (water surface) between the inside and the outside of the sub space 20. The virtual viewpoint 30 is located inside the sub space 20. The background object 4 and the virtual viewpoint 31 are located outside the sub space 20. The virtual viewpoints can move between the inside and the outside of the sub space 20.

FIG. 5A illustrates a virtual viewpoint image generated by the server 130 when the virtual viewpoint 30 is specified by the controller 120, and acquired by the image acquisition unit 210 via the storage unit 400. FIG. 5B illustrates a virtual viewpoint image generated by the server 130 when the virtual viewpoint 31 is specified by the controller 120, and acquired by the image acquisition unit 210 via the storage unit 400. More specifically, the virtual viewpoint image illustrated in FIG. 5A corresponds to an angle at which the foreground object 3 is viewed from under the water, and the virtual viewpoint image illustrated in FIG. 5B corresponds to an angle at which the foreground object 3 is viewed from above the water surface.

At the time of image capturing by the camera group 110, the upper half of the foreground object 3 is above the water surface and the lower half thereof is under the water. Therefore, a three-dimensional model of the foreground object 3 colored by using captured images has different colors on the upper half and the lower half. In the virtual viewpoint image illustrated in FIG. 5A, the foreground object 3 is drawn as if it is floating in a space without water. This is because only the foreground object 3 is extracted from the background subtraction information based on captured images, and therefore water is not expressed in the virtual viewpoint images generated by the server 130. In the virtual viewpoint image illustrated in FIG. 5B, the bottom of the pool is drawn behind the foreground object 3 as a background, the foreground object 3 is drawn as if it is floating in a space without water.

In step S302, the information acquisition unit 220 acquires the sub space information as region information related to the sub space 20 and identifies the boundary between the region inside and the region outside the sub space 20 in the image-capturing region captured by at least any one camera of the camera group 110. More specifically, as illustrated in FIG. 6, the sub space information is OBJ file format data including the XYZ coordinates corresponding to the vertexes of a polyhedron expressing the sub space 20, and index information for the vertexes included in the surfaces of the polyhedron. However, the format and contents of the sub space information are not limited thereto. For example, the sub space information may be data in other 3D file formats, or a text file describing the rectangular coordinates and sizes within the X-Y and the X-Z planes. The sub space information may also be information indicating the boundary between the inside and the outside of the sub space, for example, information indicating the height of the water surface.

In step S303, the viewpoint acquisition unit 230 acquires the viewpoint information indicating virtual viewpoints from the storage unit 400. The viewpoint information is, for example, information representing a virtual camera position $t1=(x1, y1, z1)$, an orientation $r1=(rx1, ry1, rz1)$, and a focal length $f1=(fx1, fy1)$ in three-dimensional coordinates, and is described in a text file. However, the format and contents of the viewpoint information are not limited thereto.

In step S304, the determination unit 240 determines whether the position of the virtual viewpoint indicated by the viewpoint information is included in the sub space 20 identified by the sub space information. The determination method, for example, compares the normalized normal ni=(nx, ny, nz) toward the inside on each surface of the polyhedron forming the sub space 20 with the virtual viewpoint position t1 to determine whether t1 exists in the direction pointed by the normal of each surface, i.e., t1 exists inside each surface, based on the planar equation. When ni*t1+ti=nx*x1+ny*y1+nz*z1+ti based on the planar equation is larger than 0, the determination unit 240 determines that the virtual viewpoint exists inside the surface. On the other hand, when ni*t1+ti=nx*x1+ny*y1+nz*z1+ti is equal to or less than 0, the determination unit 240 determines that the virtual viewpoint exists on or outside the surface. The parameter ti for each surface is pre-calculated based on a point (for example, any one vertex) on each surface and the planar equation. In a case where the determination unit 240 determines that the virtual viewpoint exists inside the surface for all surfaces of the polyhedron forming the sub space 20, i.e., the virtual viewpoint is included in the sub space 20 (YES in step S304), the processing proceeds to step S305. Meanwhile, in a case where the determination unit 240 determines that the virtual viewpoint is not included in the sub space 20 (NO in step S304), the processing proceeds to step S306. The method for determining whether the virtual viewpoint position is included in the sub space 20 is not limited thereto, and other methods may be used.

Figure 7A:
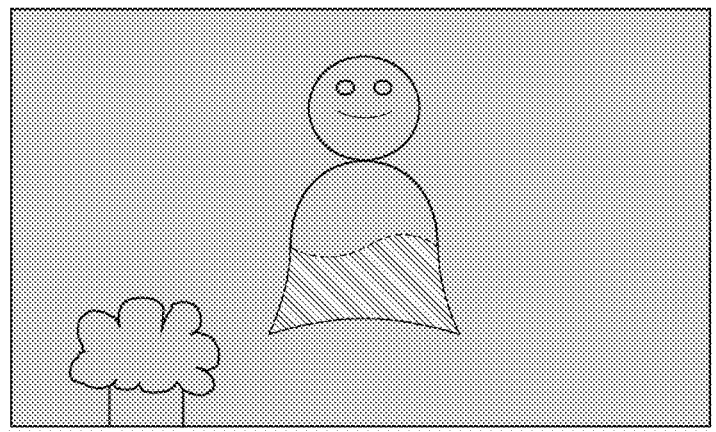
FIGS. 7A and 7B are diagrams illustrating examples of virtual viewpoint images output by the image processing apparatus.
Figure 7B:
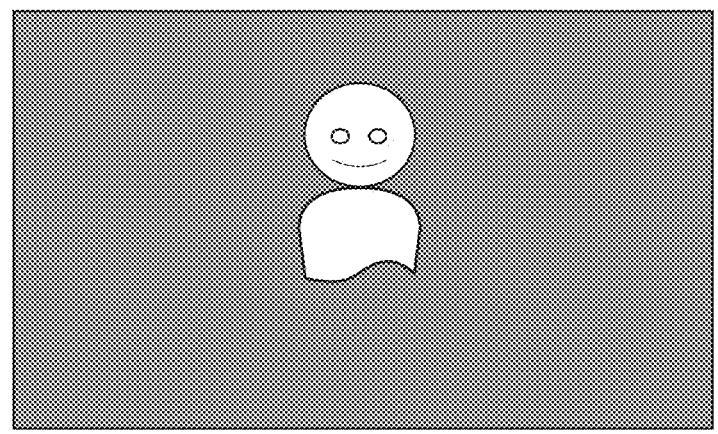

In step S305 or S306, the image processing apparatus 200 controls the display of the water surface in the virtual viewpoint image to be output to the display apparatus 300 based on the result of the determination in step S304. More specifically, in step S305, the information addition unit 250 adds an image representing the water surface viewed from under the water to the virtual viewpoint image acquired in step S301. On the other hand, in step S306, the information addition unit 250 adds an image representing the water surface viewed from above the water surface to the virtual viewpoint image acquired in step S301. Processing for adding an image representing the water surface will be described in detail below. FIG. 7A is a diagram illustrating a virtual viewpoint image generated by adding the water surface to the virtual viewpoint image illustrated in FIG. 5A in step S305. FIG. 7B is a diagram illustrating a virtual viewpoint image generated by adding the water surface to the virtual viewpoint image illustrated in FIG. 5B in step S306. In step S307, the information addition unit 250 outputs the virtual viewpoint image generated by adding the water surface in step S305 or S306 to the display apparatus 300.

An image output from the image processing apparatus 200 in this way is a virtual viewpoint image corresponding to the position of the virtual viewpoint indicated by the viewpoint information in response to an operation via the controller 120. However, unlike the virtual viewpoint image output from the server 130, the virtual viewpoint image output from the image processing apparatus 200 includes an image representing the water surface. This makes it easier for the user viewing the virtual viewpoint image output from the image processing apparatus 200 to recognize the position where a virtual viewpoint is set, based on the positional relationship between the virtual viewpoint and the water surface. In addition, a virtual viewpoint image having an image representing the water surface is closer to an appearance in the real space than a virtual viewpoint image without the water surface output from the server 130, preventing an unnatural feeling given to the user viewing the virtual viewpoint image.

In the real space, there arises a difference in view between the water surface viewed from under the water and the water surface viewed from above the water surface because of the influences of the reflection and refraction of light. Therefore, the image processing apparatus 200 determines, based on the positional relationship between the boundary of the sub space corresponding to the underwater region and the virtual viewpoint, the display pattern of the water surface as the boundary, and adds an image representing the water surface according to the determination result to generate a virtual viewpoint image having an appearance closer to that in the real space. For example, the image processing apparatus 200 generates a virtual viewpoint image different in at least either one of the water surface color and pattern between a case where the position of the virtual viewpoint indicated by the viewpoint information is under the water and a case where the position is above the water surface. This enables the user to have a virtual viewpoint image close to an appearance in the real space, whereby an unnatural feeling given to the user by the virtual viewpoint image can be reduced. Alternatively, in order to simplify processing in the image processing apparatus 200, a similar image representing the water surface may be added to the virtual viewpoint image regardless of whether the position of the virtual viewpoint is under the water or above the water surface.

[Processing for Adding Image Representing Water Surface]

Processing by the image processing apparatus 200 to generate a virtual viewpoint image in which a water surface is added in step S305 or S306 will be described in detail below. The image processing apparatus 200 acquires virtual viewpoint depth information corresponding to the virtual viewpoint image acquired from the storage unit 400. The virtual viewpoint depth information refers to information indicating the value of a depth buffer that is used by the server 130 to generate a virtual viewpoint image. For each pixel of a virtual viewpoint image, the virtual viewpoint depth information indicates the distance between a subject corresponding to the pixel and a virtual viewpoint. According to the present exemplary embodiment, the image processing apparatus 200 acquires the virtual viewpoint depth information from the server 130 via the storage unit 400. Alternatively, the image processing apparatus 200 may directly acquire the virtual viewpoint depth information from the server 130.

The image processing apparatus 200 generates a three-dimensional model of the sub space 20 representing an underwater region based on the sub space information acquired from the storage unit 400, and renders the three-dimensional model of the sub space 20 based on the viewpoint information acquired from the storage unit 400. In this case, the texture to be mapped to the three-dimensional model of the sub space 20 is determined based on the positional relationship between the virtual viewpoint and the boundary of the sub space 20. For example, when the virtual viewpoint is above the water surface (in step S306), the color of the three-dimensional model of the sub space 20 is cyan (R, G, B)=(0, 255, 255). When the virtual viewpoint is under the water (in step S305), the color differs in depth or brightness from cyan. When the virtual viewpoint is above the water surface, the three-dimensional model of the sub space 20 may be supplied with a pattern or animation representing the reflection of light and waves of water. When the virtual viewpoint is under the water, the three-dimensional model may be supplied with a pattern or animation representing air bubbles.

Then, the image processing apparatus 200 superimposes the result of rendering the sub space 20 on pixels from among pixels of the virtual viewpoint image which are acquired from the storage unit 400 and before the water surface is added. The pixels to which the result is superimposed have a distance indicated by the virtual viewpoint depth information longer than a distance between the virtual viewpoint and the water surface. For example, as a result of rendering the three-dimensional model of the sub space 20 according to a viewpoint for looking up from under the water of the pool as illustrated in FIG. 5A, the entire image is covered by the color and pattern representing water. In the image illustrated in FIG. 5A, pixels having the distance indicated by the virtual viewpoint depth information shorter than the distance between the virtual viewpoint and the water surface are pixels showing the lower half of the foreground object 3. Therefore, the image processing apparatus 200 fills pixels other than the portion of the pixels showing the lower half of the foreground object 3 in the image illustrated in FIG. 5A using the color and pattern representing water by superimposing the result of rendering the three-dimensional model of the sub space 20. The result of rendering the three-dimensional model of the sub space 20 to be superimposed may be set semi-transparent. In this case, the image processing apparatus 200 may control the transparency based on the positional relationship between the virtual viewpoint and the boundary of the sub space 20. With the above processing, a virtual viewpoint image including an image representing the water surface as illustrated in FIGS. 7A and 7B can be generated.

Figure 8A:
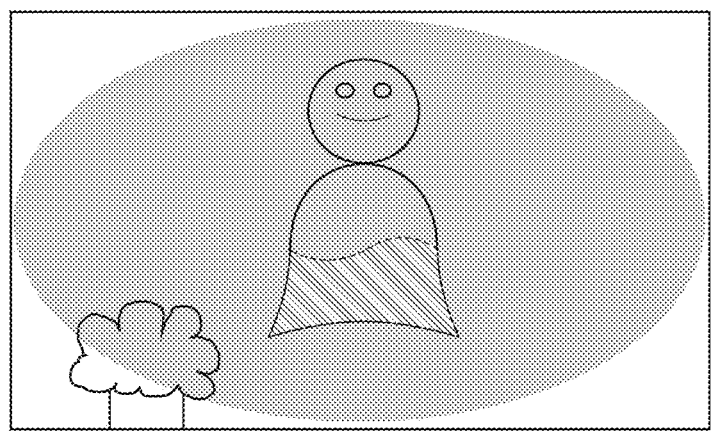
FIGS. 8A and 8B are diagrams illustrating examples of virtual viewpoint images output by the image processing apparatus.
Figure 8B:
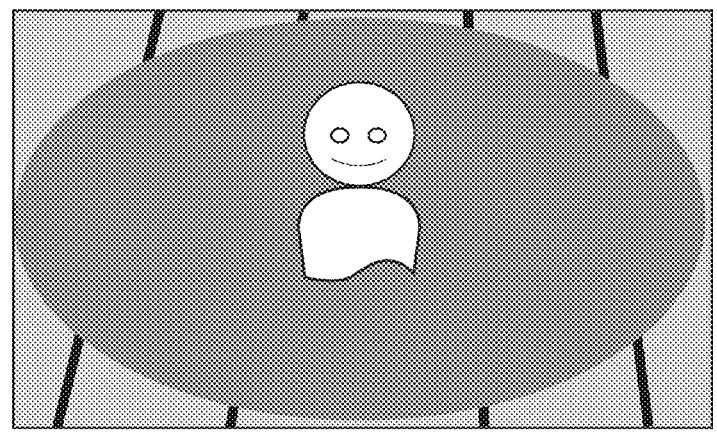

The method for generating a virtual viewpoint image in which the water surface is displayed not limited thereto. For example, instead of generating a three-dimensional model of the sub space 20 representing an underwater region, a three-dimensional model of a planar object representing the water surface may be generated. Instead of using the virtual viewpoint depth information, the image processing apparatus 200 may acquire a three-dimensional model of the foreground object 3, calculate the positional relationship between the foreground object 3 and the sub space 20, and determine the pixels on which the result of rendering the sub space 20 is to be superimposed. The image of the water surface to be added to the virtual viewpoint image is not limited to an image representing the entire water surface in the image-capturing region. For example, as illustrated in FIGS. 8A and 8B, the virtual viewpoint image may include only an image representing a part of the water surface determined based on the position of a predetermined subject in the image-capturing region, such as a range of 3 m in radius from the portion where the water surface intersects with the foreground object 3.

According to the present exemplary embodiment, the server 130 generates a virtual viewpoint image without the water surface, and then the image processing apparatus 200 adds the water surface to the image. Alternatively, the image processing apparatus 200 may directly generate a virtual viewpoint image including the water surface is displayed. More specifically, the image processing apparatus 200 acquires a three-dimensional model of the foreground object 3, and a three-dimensional model of the background object 4. The image processing apparatus 200 also generates a three-dimensional model of a planar object representing the water surface based on the sub space information acquired from the storage unit 400. Then, the image processing apparatus 200 may generate a virtual viewpoint image including the water surface is displayed, by rendering these three-dimensional models based on the viewpoint information acquired from the storage unit 400. Also, in this case, the image processing apparatus 200 may control the display of the water surface in such a manner that the texture to be mapped to the model of the object representing the water surface is differentiated according to whether the position of the virtual viewpoint exists above the water surface or under the water.

For example, based on the positional relationship between the virtual viewpoint and the water surface, the image processing apparatus 200 determines an image captured by which camera from among the plurality of cameras included in the camera group 110 is to be used, to determine the color of the image representing the water surface. When the virtual viewpoint is above the water surface, the three-dimensional model representing the water surface may be colored based on an image captured by a camera installed outside the water. When the virtual viewpoint is under the water, the three-dimensional model may be colored based on an image captured by a camera installed under the water. With this configuration, the difference in appearance due to the reflection and refraction of light between a case where the water surface is viewed from above and a case where the water surface is viewed from under the water in the real space can be reproduced in a virtual viewpoint image.

Although, in the descriptions above, the water surface is displayed in the virtual viewpoint image regardless of whether the virtual viewpoint is above the water surface or under the water, the present exemplary embodiment is not limited thereto. The image processing apparatus 200 may determine displaying or not-displaying of an image representing the water surface in the virtual viewpoint image based on the positional relationship between the virtual viewpoint and the boundary of the sub space 20. For example, the water surface may be displayed when the virtual viewpoint is above the water surface. In addition, the image displayed in a different display pattern according to the positional relationship between the virtual viewpoint and the water surface is not limited to an image representing the water surface. For example, the image processing apparatus 200 may differentiate the color of an object (for example, the foreground object 3) of which a three-dimensional model is to be generated based on an image captured by at least any one of the camera group 110, according to whether the position of the virtual viewpoint is above the water surface or under the water. The image representing the boundary of the sub space 20 included in the virtual viewpoint image generated by the image processing apparatus 200 is not limited to an image representing the water surface as the boundary between the underwater region and the region outside the water. For example, for a sport in which an image capturing target of the camera group 110 is on the ground, a sub space corresponding to an underground region may be set, and the image processing apparatus 200 may differentiate the display pattern of the ground in a virtual viewpoint image between a case where a virtual viewpoint is above the ground surface and a case where a virtual viewpoint is under the ground.

[Displaying Region Including Position of Virtual Viewpoint]

An example has been described above centering on a case where an object representing the water surface is added to the virtual viewpoint image by the information addition unit 250 of the image processing apparatus 200. However, the information to be added by the information addition unit 250 is not limited thereto. A case where an additional image for displaying information indicating the positional relationship between the position of the virtual viewpoint indicated by the viewpoint information and the boundary of the sub space is added to the virtual viewpoint image will be described below. FIG. 9 is a flowchart illustrating a processing procedure performed by the image processing apparatus 200 in this case. Steps similar to those illustrated in FIG. 3 are assigned the same reference numerals as those illustrated in FIG. 3. This processing procedure differs from the processing procedure illustrated in FIG. 3 in processing in steps S905 and S906 and therefore will be described below centering on the differences.

In a case where the determination unit 240 determines that the virtual viewpoint is included in the sub space 20 (YES in step S304), the processing proceeds to step S905. In step S905, the information addition unit 250 adds an image indicating that the position of the virtual viewpoint is included in the region inside the sub space 20 to the virtual viewpoint image. Meanwhile, in a case where the determination unit 240 determines that the virtual viewpoint is not included in the sub space 20 (NO in step S304), the processing proceeds to step S906. In step S906, the information addition unit 250 adds an image indicating that the position of the virtual viewpoint is included in the region outside the sub space 20 to the virtual viewpoint image.

FIG. 10A is a diagram illustrating a virtual viewpoint image generated by adding an additional image to the virtual viewpoint image illustrated in FIG. 5A in step S905. FIG. 10B is a diagram illustrating a virtual viewpoint image generated by adding an additional image to the virtual viewpoint image illustrated in FIG. 5B in step S906. The image added to the virtual viewpoint image illustrated in FIG. 10A is an additional image 1010 which indicates that the virtual viewpoint is under the water. Meanwhile, the image added to the virtual viewpoint image illustrated in FIG. 10B is an additional image 1011 which indicates that the virtual viewpoint is above the water surface. Each of the additional images 1010 and 1011 is combined at a predetermined position in the virtual viewpoint image, for example, the position at 50 pixels rightward and 50 pixels downward from the upper left corner of the virtual viewpoint image. The display content of the additional images 1010 and 1011 may be an animation. The position where an additional image is combined is not limited thereto. An additional image may be combined at a position specified by the user or at different positions depending on the position of the virtual viewpoint and time.

In the above described way, the display apparatus 300 displays a virtual viewpoint image including an image indicating the region including the position of the virtual viewpoint. This makes it easier for the user viewing the virtual viewpoint image to recognize whether the virtual viewpoint is set under the water or above the water surface. In comparison with the above-described method for displaying the above-described object representing the water surface, this method for displaying an additional image can simplify the processing of the image processing apparatus 200, eliminate an operation for inputting the virtual viewpoint depth information to the image processing apparatus 200. Alternatively, the image processing apparatus 200 may add to the virtual viewpoint image both the additional images illustrated in FIGS. 10A and 10B as well as the objects representing the water surface illustrated in FIGS. 7A, 7B, 8A, and 8B. This further improves the convenience for the user.

In the above-described example, an additional image is displayed in the virtual viewpoint image regardless of whether the virtual viewpoint is above the water surface or under the water. However, the present exemplary embodiment is not limited thereto. The image processing apparatus 200 may display an additional image in the virtual viewpoint image only in either a case where the virtual viewpoint is above the water surface or a case where the virtual viewpoint is under the water. Additional images are not limited to the above-described two different images displaying "UNDER WATER" and "ABOVE WATER SURFACE". For example, when a virtual viewpoint is set at a height within a predetermined range from the water surface, an additional image displaying "WATER SURFACE" may be displayed in the virtual viewpoint image. In addition, the sub space is not limited to the underwater region in the pool. For a sport in which an image capturing target of the camera group 110 is on the ground, an underground region may be set as the sub space. For example, when the image capturing target is in soccer, information to be added to the virtual viewpoint image may be differentiated according to whether the virtual viewpoint is at a position farther away from the offside line or according to which side of the midfield line the virtual viewpoint is located.

[Displaying Information Indicating Position of Virtual Viewpoint]

Figure 11:
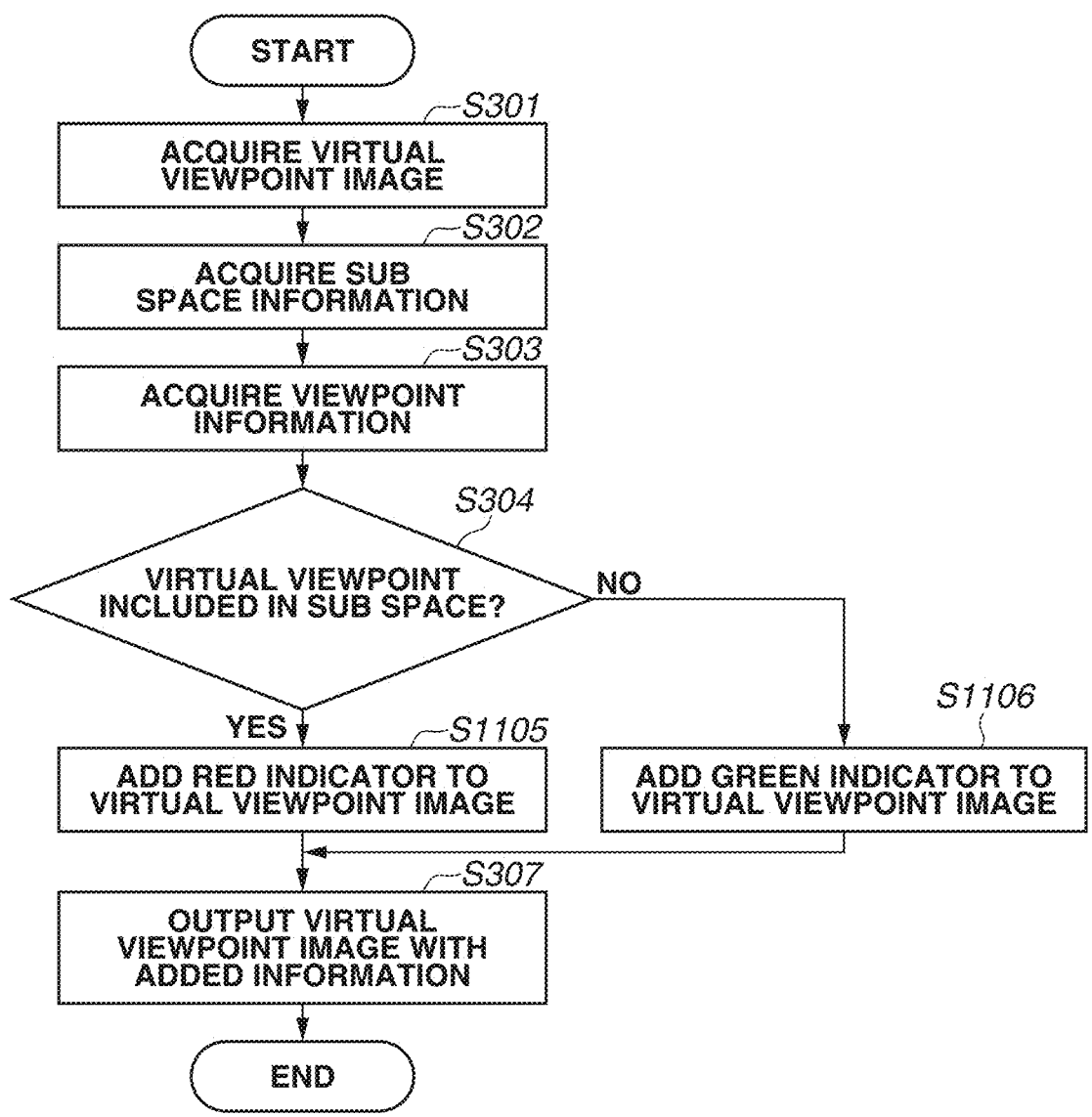
FIG. 11 is a flowchart illustrating an example of an operation of the image processing apparatus.

As another example where information is added by the information addition unit 250 to the virtual viewpoint image, description will be given of a case where information indicating the position of the virtual viewpoint indicated by the viewpoint information and the position of the boundary of the sub space is added to the virtual viewpoint image. FIG. 11 is a flowchart illustrating a processing procedure performed by the image processing apparatus 200 in this case. Processing similar to that illustrated in FIG. 3 is assigned the same reference numerals. This processing procedure differs from the processing procedure illustrated in FIG. 3 in processing in steps S1105 and S1106 and therefore will be described below centering on the differences.

In step S1105 or S1106, the information addition unit 250 adds an indicator indicating the position of the virtual viewpoint to the virtual viewpoint image. In step S1105, i.e., when the virtual viewpoint is under the water, the information addition unit 250 adds a red indicator. In step S1106, i.e., when the virtual viewpoint is above the water surface, the information addition unit 250 adds a green indicator. More specifically, the image processing apparatus 200 identifies a range (for example, a range with a height d larger than 0 and smaller than 5) where the sub space 20 exists in a predetermined axial direction (for example, in the perpendicular direction (x, y, z)=(0, 0, 1)) in the three-dimensional space based on the sub space information acquired from the storage unit 400. The image processing apparatus 200 also identifies the position of the virtual viewpoint in the above-described predetermined axial direction based on the viewpoint information acquired from the storage unit 400. Then, the image processing apparatus 200 generates an indicator indicating the relationship between the range where the above-described sub space 20 exists and the position of the virtual viewpoint, and superimposes the indicator in a color according to the result of determining whether the virtual viewpoint is included in the sub space 20 on the virtual viewpoint image.

Figure 12A:
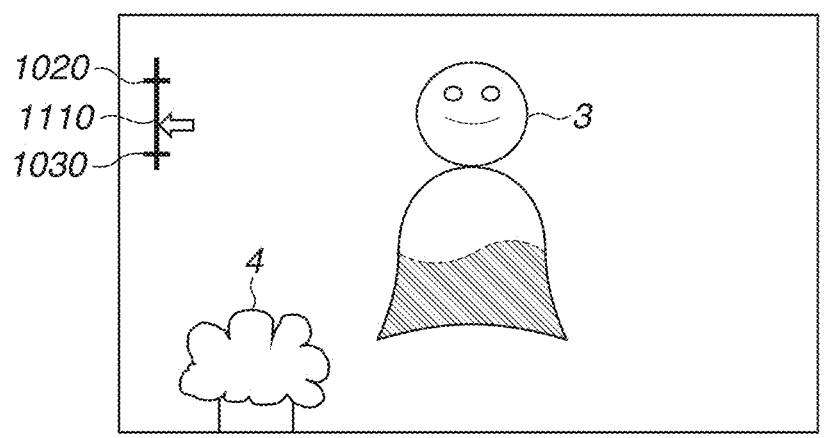
FIGS. 12A and 12B are diagrams illustrating examples of virtual viewpoint images output by the image processing apparatus.
Figure 12B:
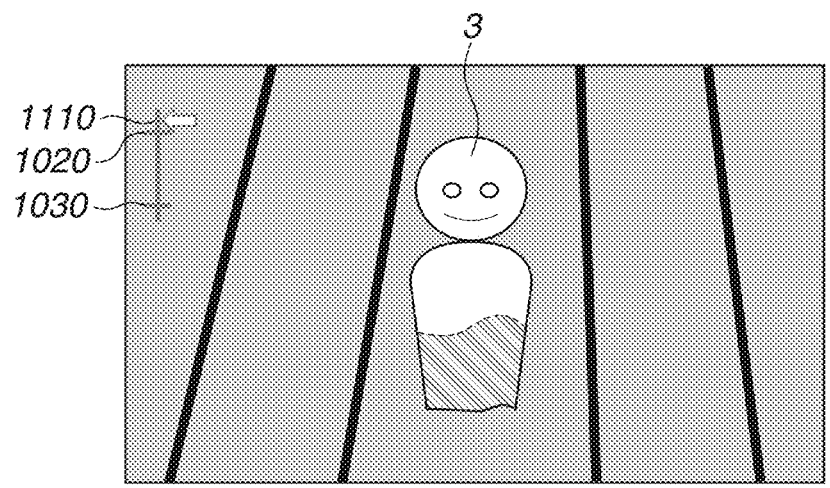

FIG. 12A is a diagram illustrating a virtual viewpoint image generated by adding an indicator to the virtual viewpoint image illustrated in FIG. 5A in step S1105. FIG. 12B is a diagram illustrating a virtual viewpoint image generated by adding an indicator to the virtual viewpoint image illustrated in FIG. 5B in step S1106. The position of an arrow 1110 on the indicator indicates the position of the virtual viewpoint in the predetermined axial direction. A line 1020 on the indicator indicates the upper limit (for example, the position of the water surface) of the range corresponding to the sub space. A line 1030 indicates the lower limit (for example, the position of the bottom) in the range corresponding to the sub space. When the position of the virtual viewpoint is within the range of the sub space (when the virtual viewpoint is under the water), the arrow 1110 is displayed between the lines 1020 and 1030, and the indicator is displayed in red, as illustrated in FIG. 12A. On the other hand, when the position of the virtual viewpoint exceeds the upper limit of the range of the sub space (when the virtual viewpoint is located above the water surface), the arrow 1110 is displayed above the line 1020, and the indicator is displayed in green, as illustrated in FIG. 12B.

As described above, the above-described indicator indicating the position of the virtual viewpoint and the position of the water surface is displayed in the virtual viewpoint image. This makes it easier for the user viewing the virtual viewpoint image to recognize the position where the virtual viewpoint is set with respect to the water surface. This method makes it easier for the user to recognize the distance between the water surface and the virtual viewpoint, further improving the convenience than in a case where "UNDER WATER" and "ABOVE WATER SURFACE" are displayed. In addition, the indicator indicating the position of the virtual viewpoint is displayed in different colors according to whether the position of the virtual viewpoint is under the water or above the water surface. This makes it easier for the user to recognize whether the virtual viewpoint image is an image viewed from a viewpoint under the water or an image viewed from a viewpoint above the water surface. Alternatively, the image processing apparatus 200 may display the indicator in the same color regardless of the position of the virtual viewpoint, or display an indicator indicating only the position of the virtual viewpoint without indicating the position of the water surface. The image processing apparatus 200 may add the indicator illustrated in FIGS. 12A and 12B to the virtual viewpoint image, together with the objects representing the water surface illustrated in FIGS. 7A, 7B, 8A, and 8B and the additional images illustrated in FIGS. 10A and 10B. This further improves the convenience for the user.

In the above-described example, an indicator is displayed in the virtual viewpoint image regardless of whether the virtual viewpoint is above the water surface or under the water. However, the present disclosure is not limited thereto. The image processing apparatus 200 may display an indicator in the virtual viewpoint image only in either a case where the virtual viewpoint is above the water surface or a case where the virtual viewpoint is under the water. The content of the indicator to be added to the virtual viewpoint image is not limited to the position of the virtual viewpoint and the position of the water surface in the height direction, and may be the positions in the horizontal direction. The format of the information indicating the position of the virtual viewpoint to be added to the virtual viewpoint images is not limited to the above-described indicator. For example, a simplified drawing of the position of the virtual viewpoint in the entire three-dimensional space, as illustrated in FIG. 4, may be combined with the virtual viewpoint image in wipe display form.

As described above, the image processing apparatus 200 according to the present exemplary embodiment generates a virtual viewpoint image based on a plurality of images obtained by capturing an image-capturing region from a plurality of directions by using the camera group 110. More specifically, the image processing apparatus 200 acquires viewpoint information indicating the position of a virtual viewpoint. Then, the image processing apparatus 200 generates a virtual viewpoint image including at least either one of an image based on the positional relationship between the boundary between the inside and the outside of a predetermined region (for example, the sub space 20) included in the image-capturing region and the virtual viewpoint, and an image representing the above-described boundary. The above-described configuration makes it easier for the user to recognize that a virtual viewpoint at what position corresponds to the generated virtual viewpoint image.

Although, in the above-described exemplary embodiment, one sub space is set inside the image-capturing region, the number of sub spaces is not limited thereto. For example, when the image-capturing region is a soccer field, a plurality of sub spaces may be set in the image-capturing region, for example, by using the half surfaces of the field as different sub spaces. In addition, the plurality of sub spaces may be partially overlapped with each other. In such a case, for example, the image processing apparatus 200 may add an image representing which sub space includes the position of the virtual viewpoint to the virtual viewpoint image, or generate a virtual viewpoint image including an object representing the boundaries between the plurality of sub spaces.

In the above-described exemplary embodiment, image display is controlled according to whether the position of the virtual viewpoint is included in the sub space. However, the present disclosure is not limited thereto. Image display may be controlled according to whether the direction of the virtual viewpoint is oriented to the sub space. In addition, a sound signal to be reproduced together with the virtual viewpoint image may be controlled according to whether the position of the virtual viewpoint is included in the sub space. For example, the sound volume when the virtual viewpoint is under the water may be made smaller than that when the virtual viewpoint is above the water surface, or the sound signal may be processed to become blurred only when the virtual viewpoint is under the water.

The present disclosure can also be achieved when a program for implementing at least one of the functions according to the above-described exemplary embodiments is supplied to a system or apparatus via a network or storage medium, and at least one processor in a computer of the system or apparatus reads and executes the program. Further, the present disclosure can also be achieved by a circuit (such as an ASIC) for implementing at least one function. The program may be provided in a form recorded in a computer-readable recording medium.

The above-described exemplary embodiment makes it easier for a user to recognize that a virtual viewpoint at what position corresponds to a generated virtual viewpoint image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-202034, filed Oct. 26, 2018, which is hereby incorporated by reference herein in its entirety.

What is claimed is:

1. An image processing apparatus comprising:
one or more memories storing instructions; and
one or more processors executing the instructions to:
obtain viewpoint information for specifying a position of a virtual viewpoint, images of an image capturing region being captured by image capturing apparatuses, each of the image capturing apparatuses capturing one or more respective images of the image capturing region from a respective position, the images of the image capturing region being used for generating a virtual viewpoint image corresponding to the position of the virtual viewpoint, and the position of the virtual viewpoint being different from the respective positions of the image capturing apparatuses;
specify a first three-dimensional region in the image capturing region and a second three-dimensional region which does not overlap the first three-dimensional region;
in a case where the position of the virtual viewpoint specified based on the obtained viewpoint information is included in the first three-dimensional region, generate position information specifying that the position of the virtual viewpoint specified based on the obtained viewpoint information is included in the first three-dimensional region;
in a case where the position of the virtual viewpoint specified based on the obtained viewpoint information is included in the second three-dimensional region, generate position information specifying that the position of the virtual viewpoint specified based on the obtained viewpoint information is included in the second three-dimensional region; and
output the generated position information to a device for generating the virtual viewpoint image corresponding to the position of the virtual viewpoint.

2. The image processing apparatus according to claim 1, wherein the one or more processors further execute the instructions to
determine whether the position of the virtual viewpoint specified based on the obtained viewpoint information is included in the first three-dimensional region or the second three-dimensional region, based on the position of the virtual viewpoint specified based on the obtained viewpoint information.

3. The image processing apparatus according to claim 1, wherein the one or more processors further execute the instructions to:
obtain region information for specifying coordinates corresponding to vertexes of the first three-dimensional region or the second three-dimensional region, and
wherein the virtual viewpoint image is generated based on the obtained region information and the obtained viewpoint information.

4. The image processing apparatus according to claim 1, wherein the generated position information comprises information indicating a distance between (i) the position of the virtual viewpoint and (ii) a boundary between the first three-dimensional region and the second three-dimensional region.

5. The image processing apparatus according to claim 1, wherein the first three-dimensional region is an underwater region,
wherein the second three-dimensional region is an overwater region, and
wherein the generated position information is information for specifying whether the position of the virtual viewpoint specified based on the obtained viewpoint information is included in the underwater region or the overwater region.

6. An image processing method comprising:
obtaining viewpoint information for specifying a position of a virtual viewpoint, images of an image capturing region being captured by image capturing apparatuses, each of the image capturing apparatuses capturing one or more respective images of the image capturing region from a respective position, the images of the image capturing region being used for generating a virtual viewpoint image corresponding to the position of the virtual viewpoint, and the position of the virtual viewpoint being different from the respective positions of the image capturing apparatuses;
specifying a first three-dimensional region in the image capturing region and a second three-dimensional region which does not overlap the first three-dimensional region;
in a case where the position of the virtual viewpoint specified based on the obtained viewpoint information is included in the first three-dimensional region, generating position information specifying that the position of the virtual viewpoint specified based on the obtained viewpoint information is included in the first three-dimensional region;
in a case where the position of the virtual viewpoint specified based on the obtained viewpoint information is included in the second three-dimensional region, generating position information specifying that the position of the virtual viewpoint specified based on the obtained viewpoint information is included in the second three-dimensional region; and
outputting the generated position information to a device for generating the virtual viewpoint image corresponding to the position of the virtual viewpoint.

7. The image processing method according to claim 6,
wherein the first three-dimensional region is an underwater region,
wherein the second three-dimensional region is an overwater region, and
wherein the generated position information is information for specifying whether the position of the virtual viewpoint specified based on the obtained viewpoint information is included in the underwater region or the overwater region.

8. A non-transitory computer-readable storage medium storing a program for causing a computer to execute an image processing method, the image processing method comprising:
obtaining viewpoint information for specifying a position of a virtual viewpoint, images of an image capturing region being captured by image capturing apparatuses, each of the image capturing apparatuses capturing one or more respective images of the image capturing region from a respective position, the images of the image capturing region being used for generating a virtual viewpoint image corresponding to the position of the virtual viewpoint, and the position of the virtual viewpoint being different from the respective positions of the image capturing apparatuses;
specifying a first three-dimensional region in the image capturing region and a second three-dimensional region which does not overlap the first three-dimensional region;
in a case where the position of the virtual viewpoint specified based on the obtained viewpoint information is included in the first three-dimensional region, generating position information specifying that the position of the virtual viewpoint specified based on the obtained viewpoint information is included in the first three-dimensional region;
in a case where the position of the virtual viewpoint specified based on the obtained viewpoint information is included in the second three-dimensional region, generating position information specifying that the position of the virtual viewpoint specified based on the obtained viewpoint information is included in the second three-dimensional region; and
outputting the generated position information to a device for generating the virtual viewpoint image corresponding to the position of the virtual viewpoint.

9. An image processing apparatus comprising:
one or more memories storing instructions; and
one or more processors executing the instructions to:
obtain viewpoint information for specifying a position of a virtual viewpoint, images of the image capturing region being captured by image capturing apparatuses, each of the image capturing apparatuses capturing a respective one or more of the images of the image capturing region from a respective position, and the position of the virtual viewpoint being different from the respective positions of the image capturing apparatuses;
specify a first three-dimensional region in the image capturing region and a second three-dimensional region which does not overlap the first three-dimensional region; and
generate a virtual viewpoint image corresponding to the position of the virtual viewpoint based on the images,
wherein at least one of a color and a transparency of an image region which is included in the generated virtual viewpoint image and which corresponds to a boundary between the first three-dimensional region and the second three-dimensional region is different between a case where the position of the virtual viewpoint is included in the first three-dimensional region and a case where the position of the virtual viewpoint is included in the second three-dimensional region.

10. The image processing apparatus according to claim 9, wherein, the at least one of a color and a transparency of the image region which is included in the generated virtual viewpoint image and which corresponds to the boundary is determined based on the position of the virtual viewpoint.

11. The image processing apparatus according to claim 9, wherein, an image capturing apparatus for determining a color of the image region which is included in the generated virtual viewpoint image and which corresponds to the boundary is specified, based on the position of the virtual viewpoint, from among the image capturing apparatuses.

12. The image processing apparatus according to claim 9, wherein the generated virtual viewpoint image includes an image region representing a part of a water surface, which is in the image capturing region, which is determined based on a position of an object in the image capturing region.

13. The image processing apparatus according to claim 9, wherein the at least one of a color and a transparency of the image region which is included in the generated virtual viewpoint image and which represents a water surface is different between a case where the position of the virtual viewpoint is below the water surface and a case where the position of the virtual viewpoint is above the water surface.

14. The image processing apparatus according to claim 9,
wherein the first three-dimensional region is an underwater region,
wherein the second three-dimensional region is an overwater region, and
wherein the boundary is a water surface.

15. The image processing apparatus according to claim 9,
wherein the one or more processors execute the instructions further to:
generate a three dimensional model representing the boundary, and
determine a color of the three dimensional model representing the boundary based on the position of the virtual viewpoint.

16. An image processing method comprising:
obtaining viewpoint information for specifying a position of a virtual viewpoint, images of the image capturing region being captured by image capturing apparatuses, each of the image capturing apparatuses capturing a respective one or more of the images of the image capturing region from a respective position, and the position of the virtual viewpoint being different from the respective positions of the image capturing apparatuses;
specifying a first three-dimensional region in the image capturing region and a second three-dimensional region which does not overlap the first three-dimensional region; and
generating a virtual viewpoint image corresponding to the position of the virtual viewpoint based on the images,
wherein at least one of a color and a transparency of an image region which is included in the generated virtual viewpoint image and which corresponds to a boundary between the first three-dimensional region and the second three-dimensional region is different between a case where the position of the virtual viewpoint is included in the first three-dimensional region and a case where the position of the virtual viewpoint is included in the second three-dimensional region.

17. A non-transitory computer-readable storage medium storing a program for causing a computer to execute an image processing method, the image processing method comprising:

obtaining viewpoint information for specifying a position of a virtual viewpoint, images of the image capturing region being captured by image capturing apparatuses, each of the image capturing apparatuses capturing a respective one or more of the images of the image capturing region from a respective position, and the position of the virtual viewpoint being different from the respective positions of the image capturing apparatuses;

specifying a first three-dimensional region in the image capturing region and a second three-dimensional region which does not overlap the first three-dimensional region; and generating a virtual viewpoint image corresponding to the position of the virtual viewpoint based on the images, wherein at least one of a color and a transparency of an image region which is included in the generated virtual viewpoint image and which corresponds to a boundary between the first three-dimensional region and the second three-dimensional region is different between a case where the position of the virtual viewpoint is included in the first three-dimensional region and a case where the position of the virtual viewpoint is included in the second three-dimensional region.

* * * * *